(12) United States Patent
Finger-Albert et al.

(10) Patent No.: US 11,108,295 B2
(45) Date of Patent: Aug. 31, 2021

(54) CONTACT RING FOR A STATOR OF AN ELECTRIC MOTOR

(71) Applicant: VALEO SIEMENS EAUTOMOTIVE GERMANY GMBH, Erlangen (DE)

(72) Inventors: Christian Finger-Albert, Bad Kissingen (DE); Stefan Oetzel, Schmalkalden (DE); Michael Menz, Hollstadt (DE); Florian Balling, Bad Neustadt (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 121 days.

(21) Appl. No.: 16/523,020

(22) Filed: Jul. 26, 2019

(65) Prior Publication Data
US 2020/0036254 A1     Jan. 30, 2020

(30) Foreign Application Priority Data
Jul. 27, 2018  (DE) ............... 10 2018 118 280.5

(51) Int. Cl.
*H02K 3/50* (2006.01)
*H02K 7/00* (2006.01)
*H01R 39/02* (2006.01)

(52) U.S. Cl.
CPC ............ *H02K 3/50* (2013.01); *H01R 39/02* (2013.01); *H02K 7/006* (2013.01); *H02K 2203/09* (2013.01)

(58) Field of Classification Search
CPC ....... H02K 3/50; H02K 7/006; H02K 2203/09
USPC ......................................... 310/71, 68 B, 68 D
See application file for complete search history.

(56) References Cited

U.S. PATENT DOCUMENTS

| 10,097,057 B2 | 10/2018 | Kessler et al. | |
| 2010/0295394 A1* | 11/2010 | Sahara | H02K 11/33 310/71 |
| 2017/0366060 A1 | 12/2017 | Haberkorn et al. | |
| 2018/0316239 A1* | 11/2018 | Ogawa | H02K 11/30 |

FOREIGN PATENT DOCUMENTS

| DE | 102010039340 A1 | 2/2012 | |
| DE | 102015200089 B4 | 3/2017 | |
| DE | 102016205633 A1 * | 10/2017 | ............... H02K 3/28 |
| EP | 2959564 B1 | 5/2018 | |
| JP | 2017-085756 A | 5/2017 | |
| KR | 20-2011-0008582 U | 9/2011 | |

* cited by examiner

*Primary Examiner* — Jose A Gonzalez Quinones
(74) *Attorney, Agent, or Firm* — Manabu Kanesaka

(57) ABSTRACT

A contact ring for a stator of an electric motor has three planes, i.e. a first plane with at least one first conductor; a second plane made of an electrically insulating material; and a third plane with at least one second conductor, and at least one first and one second feedthrough passing through the second plane. The first feedthrough is smaller than the second feedthrough, and the first feedthrough guides coil wires of one coil and the second feedthrough guides coil wires of at least two coils.

9 Claims, 10 Drawing Sheets

CONTACT RING FOR A STATOR OF AN ELECTRIC MOTOR

RELATED APPLICATIONS

The present application is based on, and claims priority from, German Application No. 10 2018 118 280.5 filed Jul. 27, 2018, the disclosure of which is hereby incorporated by reference herein in its entirety.

The invention relates to a contact ring for a stator of an electric motor.

PRIOR ART

Electric motors are generally known, and are finding increasing use for powering vehicles. An electric motor consists of a stator and a rotor.

The stator comprises multiple slots in which the windings are guided. In the end winding, the windings meet and are connected. To make it simple to produce this connection, so-called contact rings or wiring boards are known.

Such a wiring board is shown in DE 10 2015 200 089 B4. This wiring board has axial spacers, which can be supported directly on the end face of the stator.

EP 2 959 564 B1 discloses a contact ring that connects each coil end with the coil ends of two other phases, forming a neutral point.

GOAL AND SOLUTION

The goal of this invention is to improve a contact ring.

This is accomplished by a contact ring according to the principal claim. Other advantageous embodiments are the subject of the dependent claims.

The inventive contact ring for a stator of an electric motor has three planes, a first plane with at least one first conductor, a second plane made of an electrically insulating material, a third plane with at least one second conductor, and at least one first and one second feedthrough passing through the second plane, the first feedthrough being smaller than the second feedthrough, and the first feedthrough guiding coil wires of one coil and the second feedthrough guiding coil wires of at least two coils.

The coil wires also can be, for example, coil wire ends.

The first feedthroughs can hold coil wires of one coil, the larger second feedthroughs being able to hold the coil wires of two coils. Thus, in the second feedthroughs it is already possible, within the feedthrough, for two coil wires from two different coils to make contact.

The first conductors can be neutral conductors, which electrically connect the coil wire ends in the first feedthroughs.

The second conductors can be phase conductors which connect the coil wire ends of at least two coils in the second feedthroughs with coil wire ends of at least two other coils in another second feedthrough.

Arranging the first and second conductors on different sides of the insulating material gives the contact ring a compact structure.

Preferably, at least one second conductor can stand upright on the contact ring.

The second conductor has a height that is greater than its width.

In another embodiment of the invention, the coil wires can be guided in the feedthroughs in crimped sleeves.

Crimping the coil wire ends in the sleeves makes it possible to overcome the insulation of the individual wires in the wire bundle. This makes it possible to create a conductive connection, through the sleeve, between the coil wire ends and the conductor.

More preferably, the coil wires can be welded to the first or second conductor.

Welding allows a conductive connection that simultaneously has sufficient mechanical stability.

In another embodiment, at least one first conductor can have an extension in the direction of the second conductors, and this extension can be routed through the first feedthrough.

Extending the first conductor through the first feedthroughs allows both the first conductors and also the second conductors to make contact with the end of the coil wires or the sleeves on the same side of the contact ring. The first conductors are connected with the coil wire ends in the first feedthroughs, and each of the second conductors is connected with the coil wire ends of two coils in the second feedthroughs. This is especially helpful if the contact ring is set on the stator and the coil wires should be as short as possible. Then, it is simple to make contact on the side facing away from the stator.

Preferably, the second plane can have at least one support for the second conductors.

The support can be a clip-in support, into which a conductor can be inserted from above and then held by a variable catch.

The second conductors can be put through the supports, for example, only after the first conductors make contact with the corresponding coil wire ends on the contact ring.

More preferably, the contact ring can have at least one support element that interacts with the stator or a stator end plate of the stator.

This support element creates, for example, a defined distance to the core of the stator. In addition, the support element gives the contact ring a hold for making contact with the coil wire ends or sleeves.

In another preferred embodiment of the invention, the cross section of the second conductor can taper from one current connection point to another current connection point, or it can have a jump in cross section.

The cross section of the second conductor depends on the current to be conducted and can have, for example, a greater cross section from a first current connection point to a second current connection point than from this second current connection point to a third current connection point. The change in cross section can be abrupt or continuous.

The first current connection point can be an interface to the inverter, and the second and third current connection points can each be a contact point to two coil wire ends or sleeves in a second feedthrough.

Preferably, the first plane can have a larger distance to the stator than the third plane does, and the second plane can be arranged between the first and third planes.

After the contact ring is set on the stator, the third plane is more accessible than the first plane, and it is simpler, for example, for the coil wire ends to make contact with the sleeves or conductors there than on the first plane.

Thus, the contact ring can, for example, be set on the stator and contact can be made on the side of the contact ring facing away from the stator only after it has been set on the stator.

In one embodiment of the invention, the first conductors carry a smaller current than the second conductors, and therefore have a smaller cross section than the second conductors. Thus, the first conductors can be arranged on the contact ring flat, that is so that the width of the conductors is greater than their height.

In another embodiment of the invention, the contact ring can have another plane. The other plane can lie, for example, beneath the first plane in the direction of the stator, increasing the electrical insulation between the stator and the first plane.

In another embodiment of the invention, the contact ring and the stator can be encapsulated with a sealing material. This protects the stator from moisture.

According to the invention, a vehicle has a contact ring for a stator of an electric motor according to one of the preferred embodiments.

DESCRIPTION OF THE FIGURES

FIG. 1 shows a contact ring 1 with an outside diameter 9 and an inside diameter 3. The contact ring 1 has multiple feedthroughs 11, 13, 15. The first feedthroughs 13, 15 have a first diameter and the second feedthroughs 11 have a second diameter. Each of the first feedthroughs 13, 15 has the coil wire end of one coil in it, and the larger second feedthroughs 11 have the coil wire ends of two coils in them. Thus, two coil wire ends have already made contact in the second feedthroughs 11.

The continuous second plane 5 made of insulating material gives the ring 1 its stability.

Figure 1:
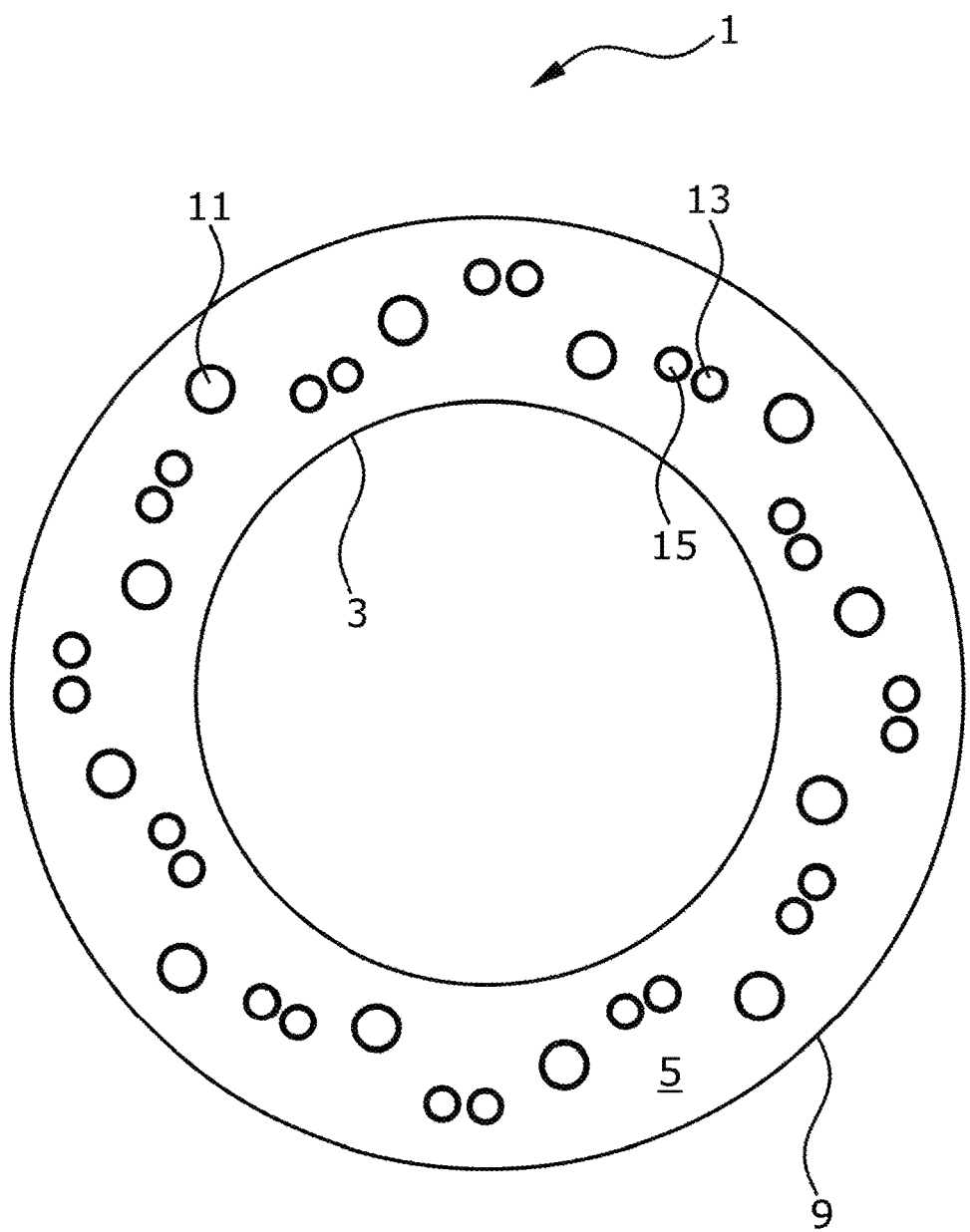
FIG. 1 shows a top view of a contact ring.
Figure 2:
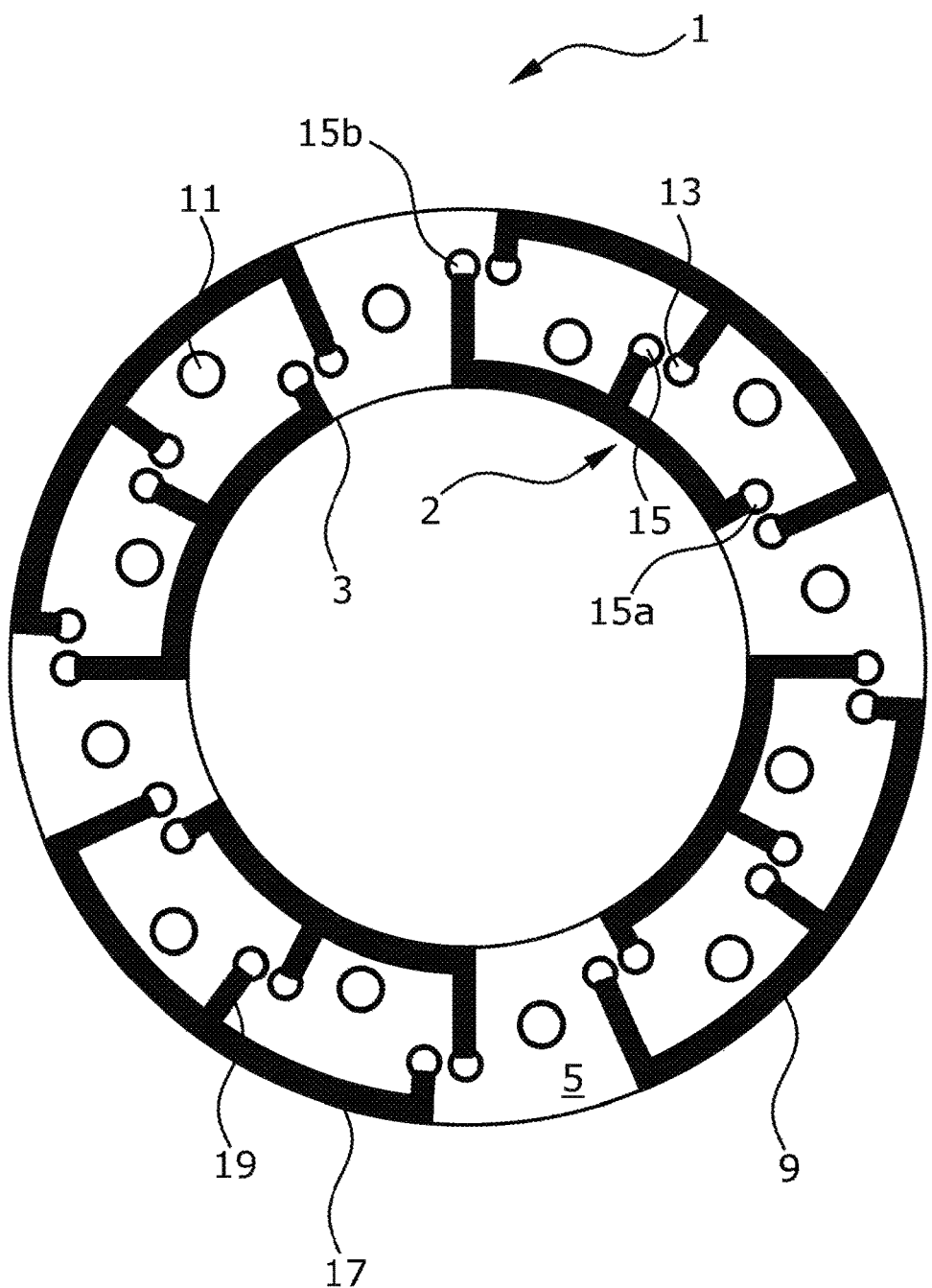
FIG. 2 shows the neutral plane of a contact ring.

FIG. 2 shows a bottom view or a transparent inside view of the first plane of the contact ring 1. The first plane is, for example, a neutral plane. Selected first feedthroughs 13, 15 are each connected with conducting sections 17 through conducting strips 19, each of which functions as a first conductor or neutral conductor 2. Three first feedthroughs 15, 15a, 15b each have a conducting connection through one neutral conductor 2 in the form of a neutral point. The conducting sections 17 are located on the outer 9 or inner surface 3 of the contact ring 1 and have a connecting strip 19 to the feedthroughs 13, 15. This achieves a maximum separation for the insulation between different neutral conductors 2.

Furthermore, FIG. 2 shows that only every three first feedthroughs 15, 15a, 15b are connected together through a neutral conductor 2. This connects three coil wire ends or sleeves into a neutral point. The second feedthroughs 11, each of which can hold the coil wire ends of two coils, are not connected through the neutral connectors 2.

Figure 3:
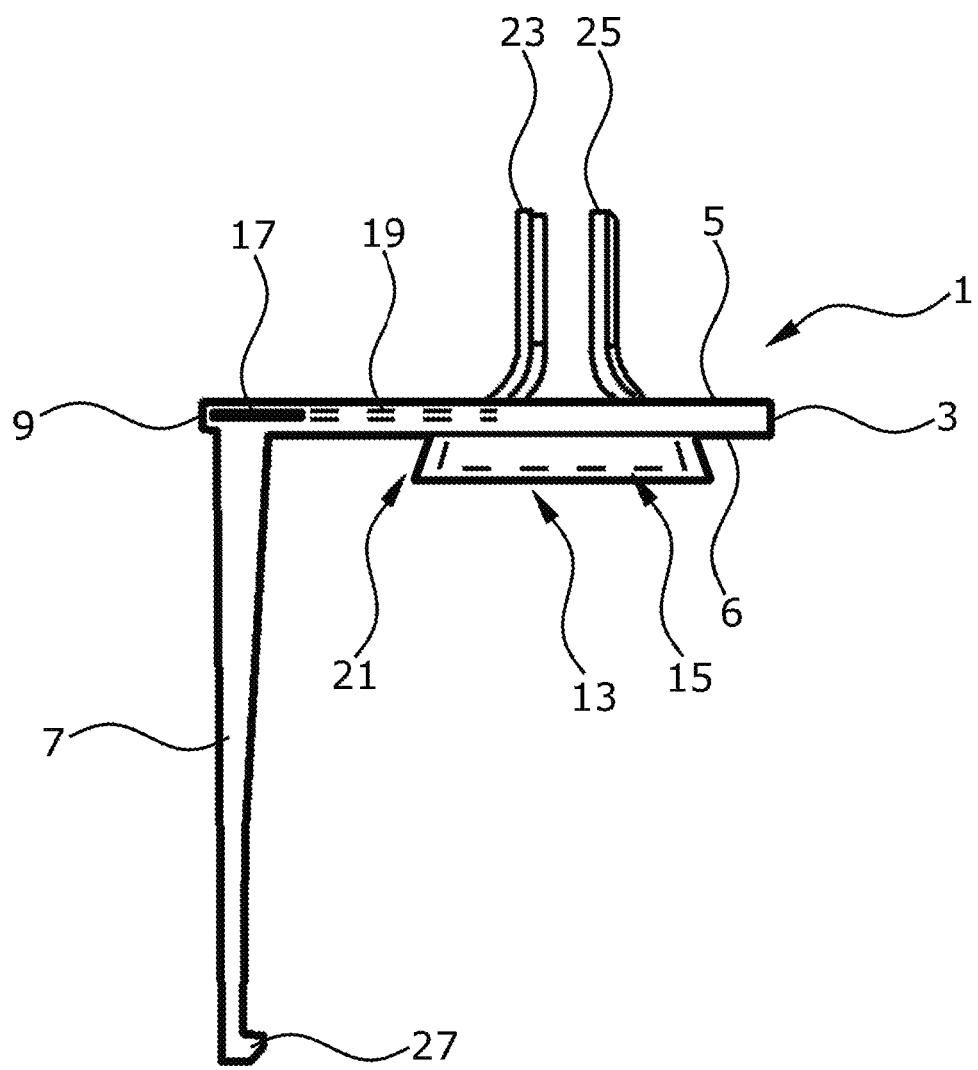
FIG. 3 shows a cross section of a contact ring.

FIG. 3 shows a cross section of a contact ring 1. In the embodiment shown in FIG. 3, the neutral plane is located in the middle of the contact ring 1. Above the neutral plane is the second plane 5 in the form of insulation between the first and third planes. Beneath the neutral plane is an additional plane 6, which also consists of electrically insulating material. The three planes, that is the second plane 5, the first plane (neutral plane), and the additional plane 6 can be formed by extrusion-coating the neutral conductor 2 of the first plane with electrically insulating material.

Furthermore, FIG. 3 shows a first feedthrough 13, which can hold the coil wire ends of a coil with or without a sleeve. Behind the feedthrough 13 there is another feedthrough 15, which is indicated by a dashed line. The feedthroughs 13, 15 are flared in the direction of a stator 21. This makes it easier to insert the coil wire ends into the feedthroughs 13, 15, with or without a sleeve. The conducting sections 17 are located, for example, on the outer edge 9 of the contact ring 1 and lead inward through a strip 19 to the feedthrough 13, 15, from where the strips 19 of the conducting sections 17 are bent upward. These upward-bent sections 23, 25 can have, for example, the coil wire ends fastened to them. This can be done, for example, by welding the wire, by crimping an end sleeve onto the wires and welding the end sleeve, or by similar fastening known to the person skilled in the art. In the same way, it is conceivable that the sleeve is already a component of the bent section 23, 25, and that the coil wire ends are inserted directly into the sleeve and crimped only then. Crimping creates electrical contact between the coil wire ends and the sleeve. This eliminates the electrical insulation of the coil wire ends.

The contact ring 1 has, on the outer edge 9, a support element 7 that allows the contact ring 1 to be supported on the stator either directly, or by means of a stator end plate, for example. The stator or the stator end plate can also have a groove or recess in which a catch 27 of the support element 7 can engage to improve the stability.

Figure 4:
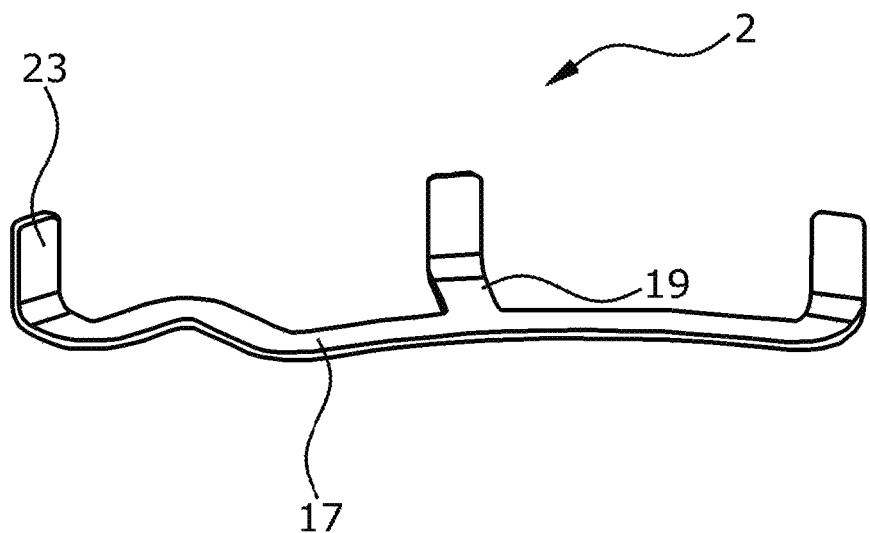
FIG. 4 shows two embodiments of a neutral conductor.
Figure 4:
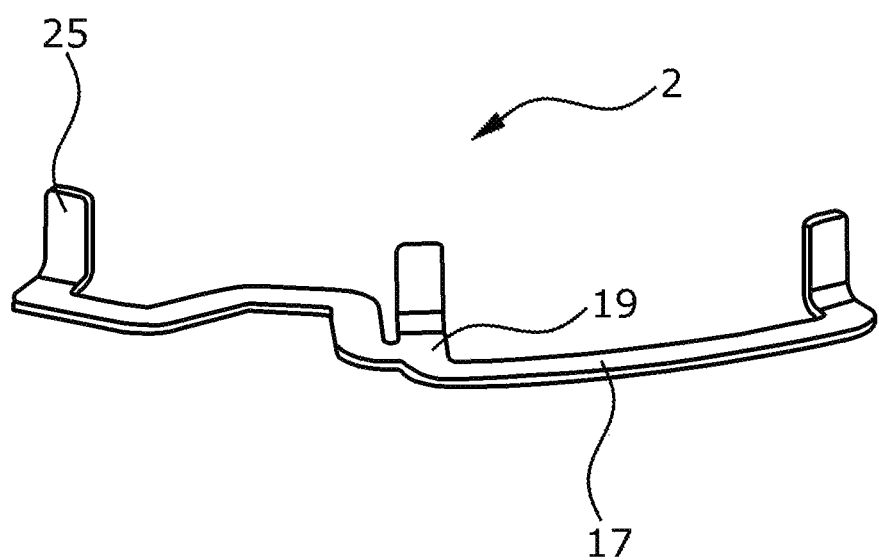

FIG. 4 shows two sample embodiments of the neutral conductor 2. The neutral conductors 2 consist of a conducting section 17, a conducting strip 19, and a bent conducting section 23, 25. The section 17 can be routed on the outer edge of the contact ring 1. The function of the connector to the feedthroughs is performed by the strip 19. The strip is bent upward, and its upward-bent section 23, 25 penetrates the feedthrough.

The neutral conductors 2 can either be inserted through the contact ring 1 from below, or they are already extrusion-coated with the insulating material and then lie within the contact ring 1, between the second plane 5 and the additional plane 6. Thus, in the sample embodiment of the extrusion-coated neutral conductor, the neutral plane has an additional electrically insulating plane located beneath it which provides insulation in the direction of the stator.

As is shown by the reference numbers 23, 25, FIG. 4 shows two different neutral conductors 2. The two neutral conductors do not cross in the neutral plane, and connect different coil wire ends in the first feedthroughs. Thus, in each case three coil wire ends are connected to one neutral point.

Figure 5:
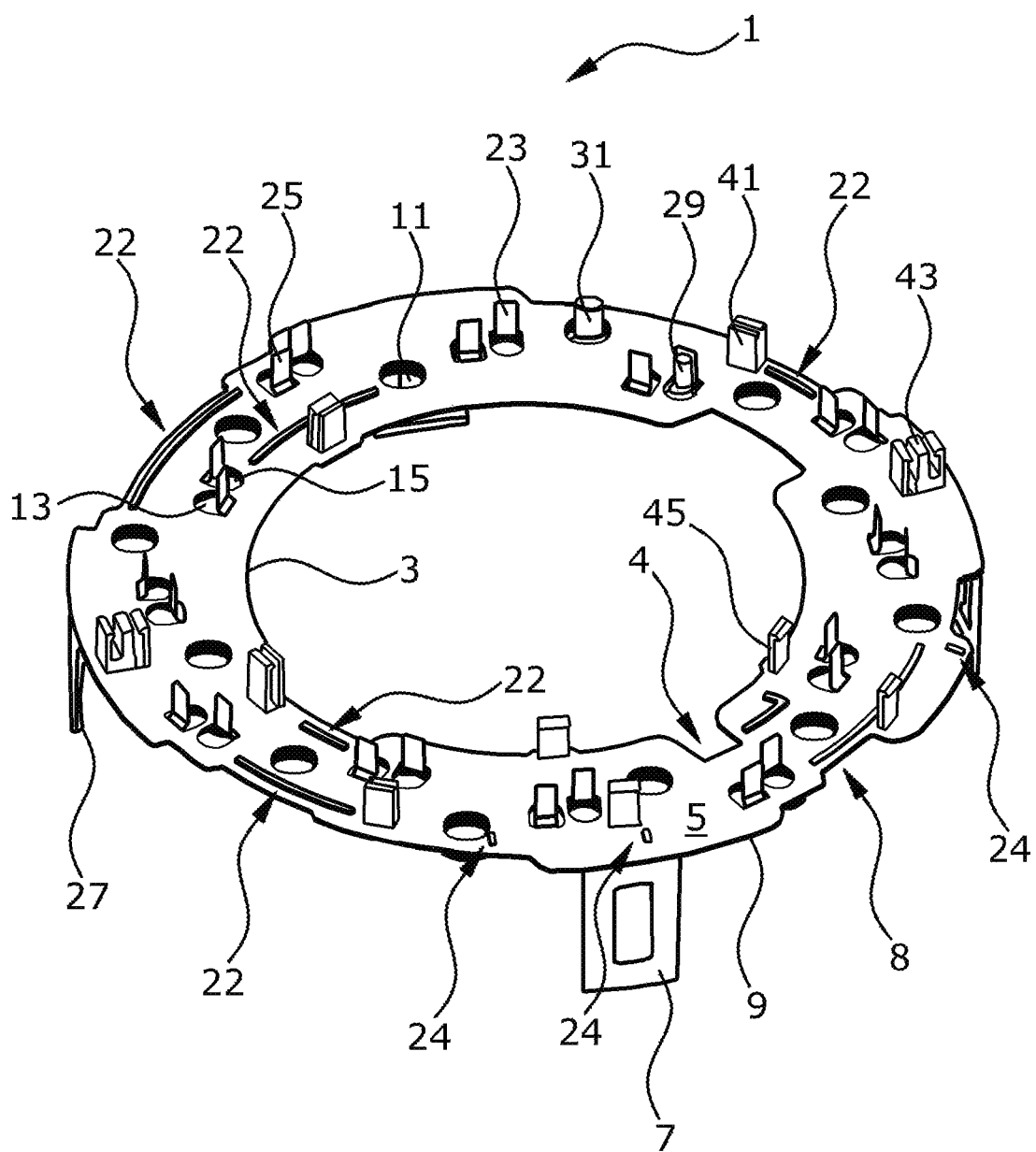
FIG. 5 shows another view of a contact ring.

FIG. 5 shows a view of a contact ring 1. The neutral plane is located beneath the insulation plane 5. In the case of extrusion-coated neutral conductors, another insulation plane that might be present in the form of an additional plane beneath the neutral plane is not visible in FIG. 5, which is a top view. The diameters of the first feedthroughs 13, 15 for holding the coil wire ends of individual coils should be different from those of the feedthroughs 11 for holding the coil wire ends of two coils. The upward-bent sections 23, 25 of the neutral conductors can be seen in the feedthroughs 13, 15 for the individual coils.

Furthermore, an example is also shown of the coil wire end of a coil with a neutral sleeve 29 crimped on to it. In the same way, a crimped-on phase sleeve 31 is shown, which is crimped over the coil wire ends of two coils and inserted into a second feedthrough 11.

For connecting the coil wire ends in the second feedthroughs 11 by means of a second conductor, the ring has supports 41, 43, 45. The supports are, for example, in the form of supports 43 for holding two conductors. In the same way, there are supports 41 that hold only one conductor. In addition, there are also supports 45 that the only support the conductors on one side. The selection of the correct support depends on the shape or position of the second conductor.

In addition, the support elements 7 are designed with a catch 27 for a recess on the stator or on a stator end plate. In addition, the contact ring 1 has recesses 4, 8, to save weight.

The contact ring 1 has elevations 22 on it that are made of electrically insulating material in the third plane, that is the phase plane. These elevations 22 allow a small separation of the phase conductors to one another and also to the first feedthroughs of the neutral plane or their bent sections 23, 25 or coil wire ends with any sleeves 29 there might be.

In addition, the contact ring 1 has support catches 24 in the third plane for an interface.

Figure 6:
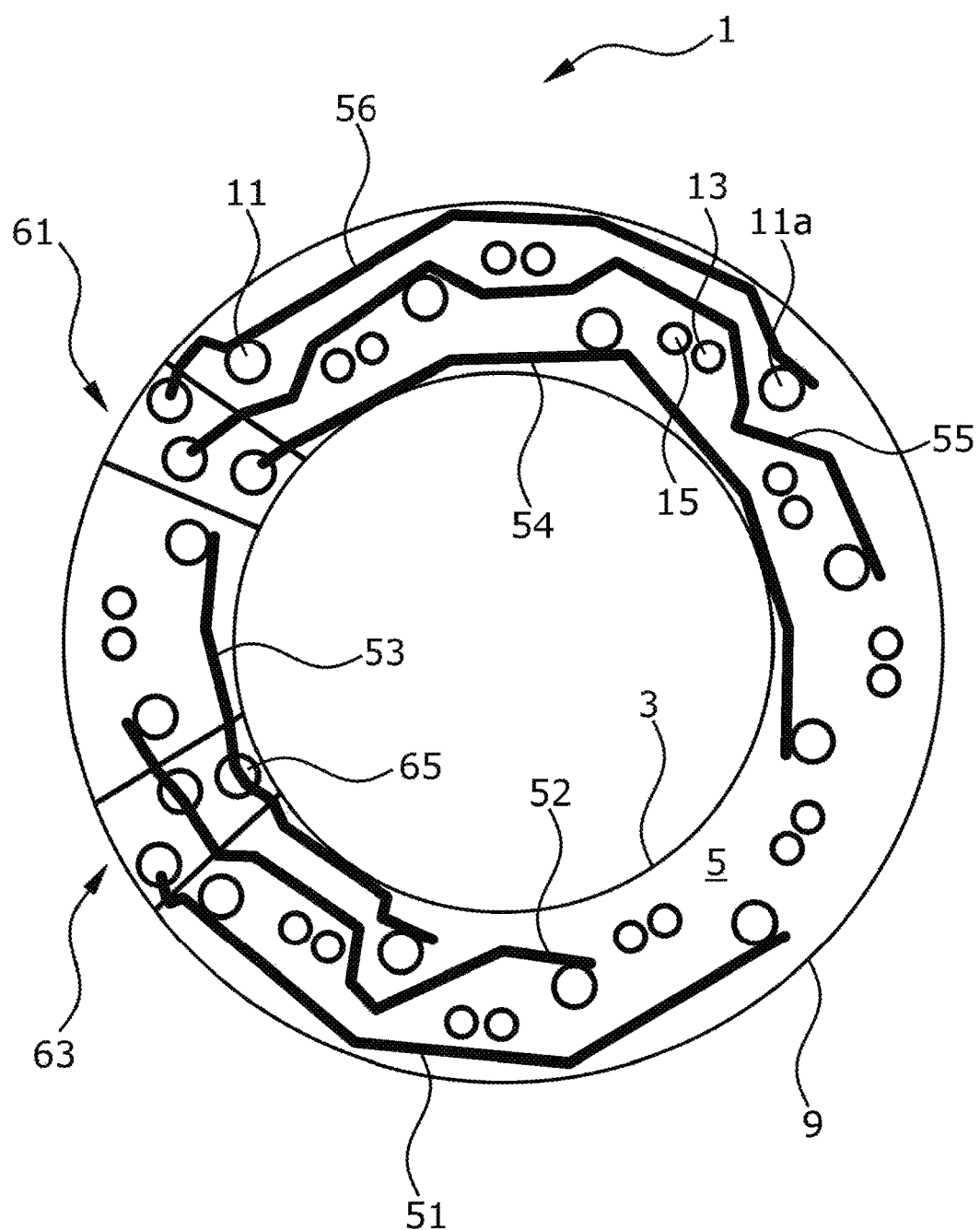
FIG. 6 shows the phase plane of a contact ring.

FIG. 6 shows the third plane, that is the phase plane, on top of the contact ring 1. The coil wire ends of two coils are located together in one of the second feedthroughs 11. Two feedthroughs 11, 11a, each with two coil wire ends, are connected together by a so-called phase conductor 56. The two coil wire ends can be crimped in a sleeve, also called a phase sleeve. The first feedthroughs 13, 15 are not connected by the second conductors 51, 52, 53, 54, 55, 56, also called phase conductors, but rather the phase conductors are routed around these first feedthroughs 13, 15 at a sufficient distance to ensure electrical insulation. Parts of the phase conductors 54, 55, 56 are connected at the end with a contact interface 61, which provides a defined interface to an inverter, for example. Another contact interface 63 is connected with the phase conductors 51, 52, 53, which are connected with the contact interface 63 in the middle, that is between two contact points of coil wire ends.

Figure 7:
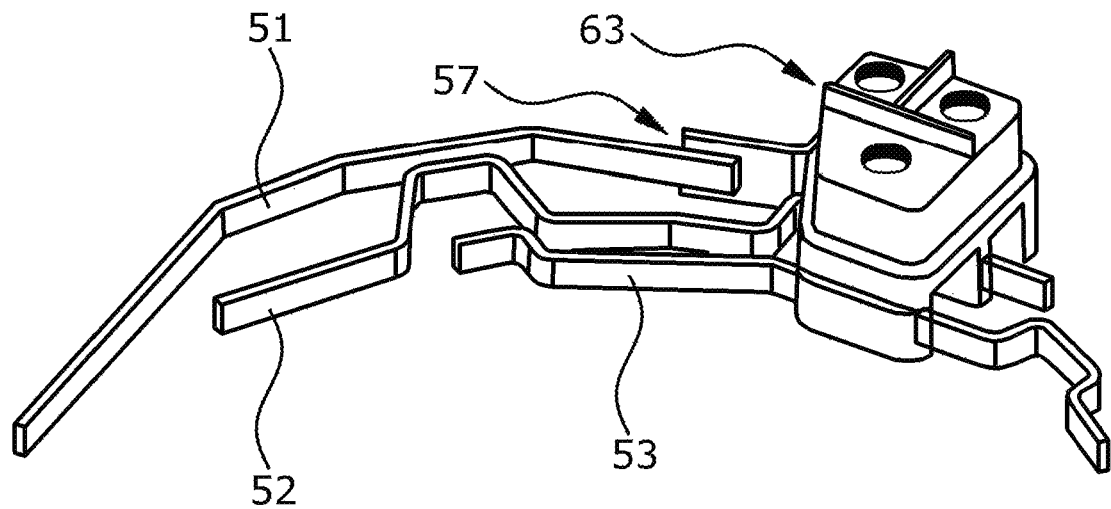
FIG. 7 shows two embodiments of a phase conductor.
Figure 7:
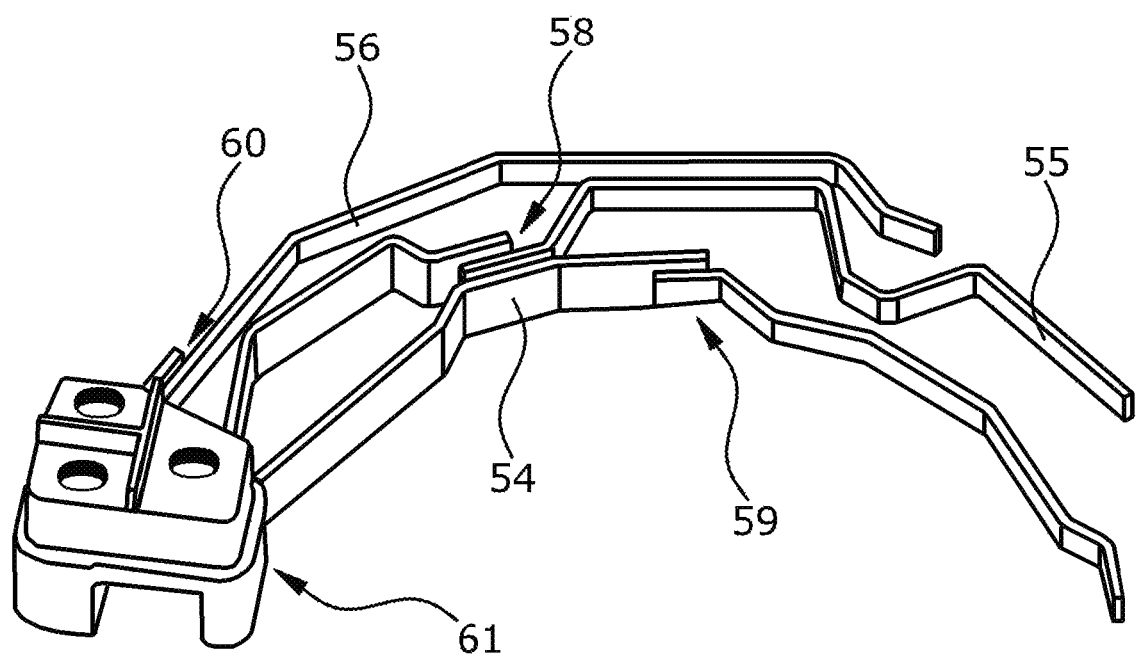

FIG. 7 shows sample embodiments of the phase conductors 51, 52, 53, 54, 55, 56 including a defined interface 61, 63 to the inverter. The phase conductors are bent so that first of all they connect together the correct ends of the coil wire ends according to a winding diagram, and simultaneously maintain a sufficient insulation distance from the other phase conductors and from the first feedthroughs of the neutral plane.

The current load of the phase conductors depends on a contact position of the current connection point with the ends of the coil wire ends, so that the cross section of the phase conductors and also the associated height of the phase conductors differ. For the path from the first current connection point to the second current connection point, the cross section is smaller than for the path from the second current connection point to the interface to the inverter 61, 63. Therefore, the phase conductors can have a jump 57, 58, 59, 60 in the cross-sectional surface after the second current connection point. It is also possible for the phase conductor to taper continuously in the direction toward the end remote from the interface 61, 63.

Figure 8:
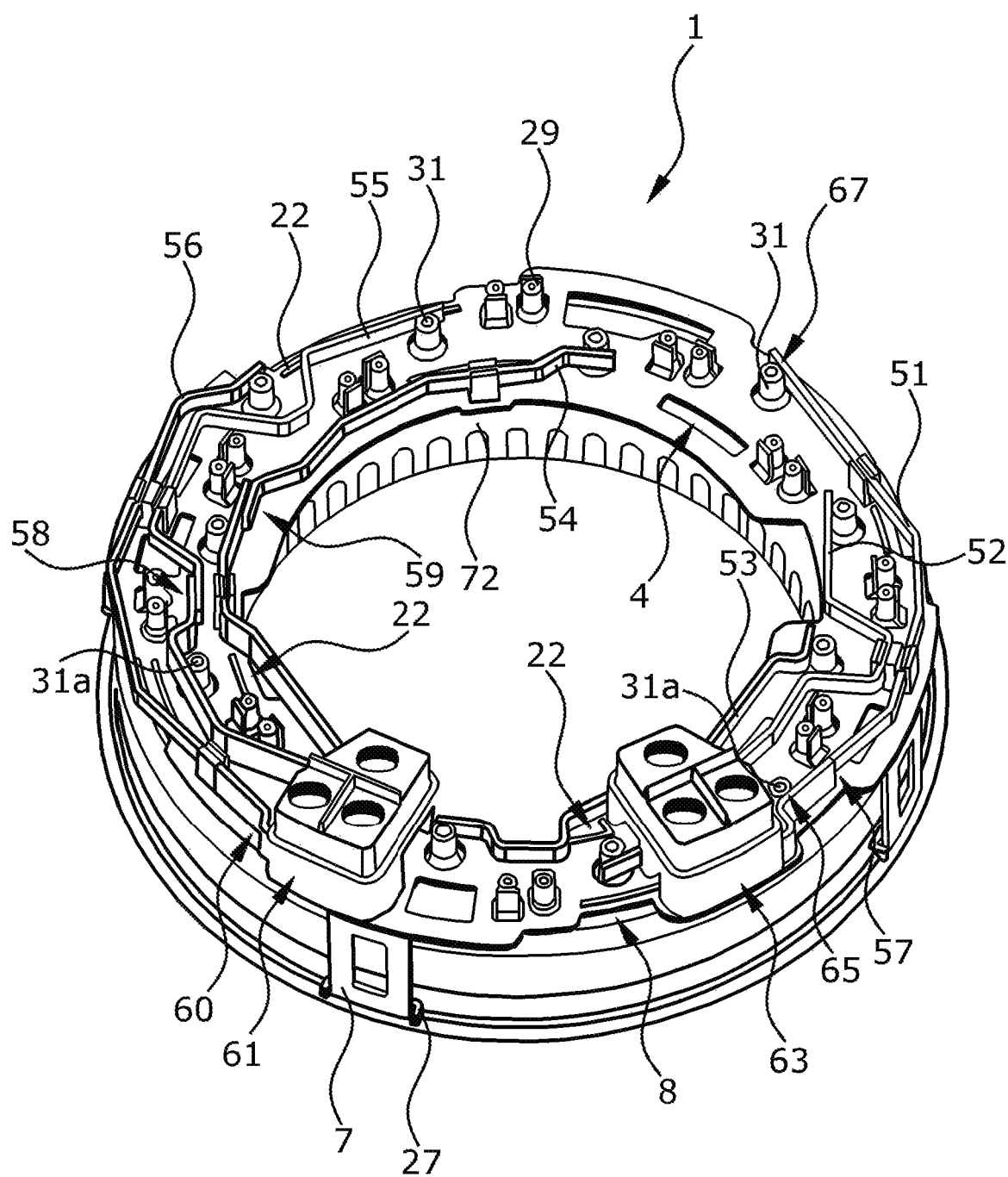
FIG. 8 shows another embodiment of a contact ring.

FIG. 8 shows a contact ring 1 with six second conductors, or phase conductors 51, 52, 53, 54, 55, 56. Each of the phase conductors is connected with an interface 61, 63 and two sleeves 31, 31a, each with coil wire ends of two coils.

For example, a phase conductor 51 is connected with the interface 63. Phase conductor 51 has a first cross section from the interface 63 to the current connection point 65 with sleeve 31a, which is connected with the coil wire ends of two coils. After that, the phase conductor 51 runs to another current connection point 67 with another sleeve 31, which is connected with the coil wire ends of two other coils. Between the current connection point 65 and the other current connection point 67, the cross section of the phase conductor 51 decreases. In the embodiment shown in FIG. 8, this decrease occurs in the form of a jump 57 in cross section.

Of the five other phase conductors 52, 53, 54, 55, 56, three (54, 55, 56) also have a jump 58, 59, 60 in cross section, which is also additionally shown in FIG. 7.

Also shown are the elevations 22, which ensure electrical insulation between the current-carrying components.

The contact ring 1 in FIG. 8 also has support elements 7 with a catch 27 for a recess that is formed on the stator 72 or on a stator end plate. In addition, the contact ring 1 has cutouts 4, 8, to save weight.

Figure 9:
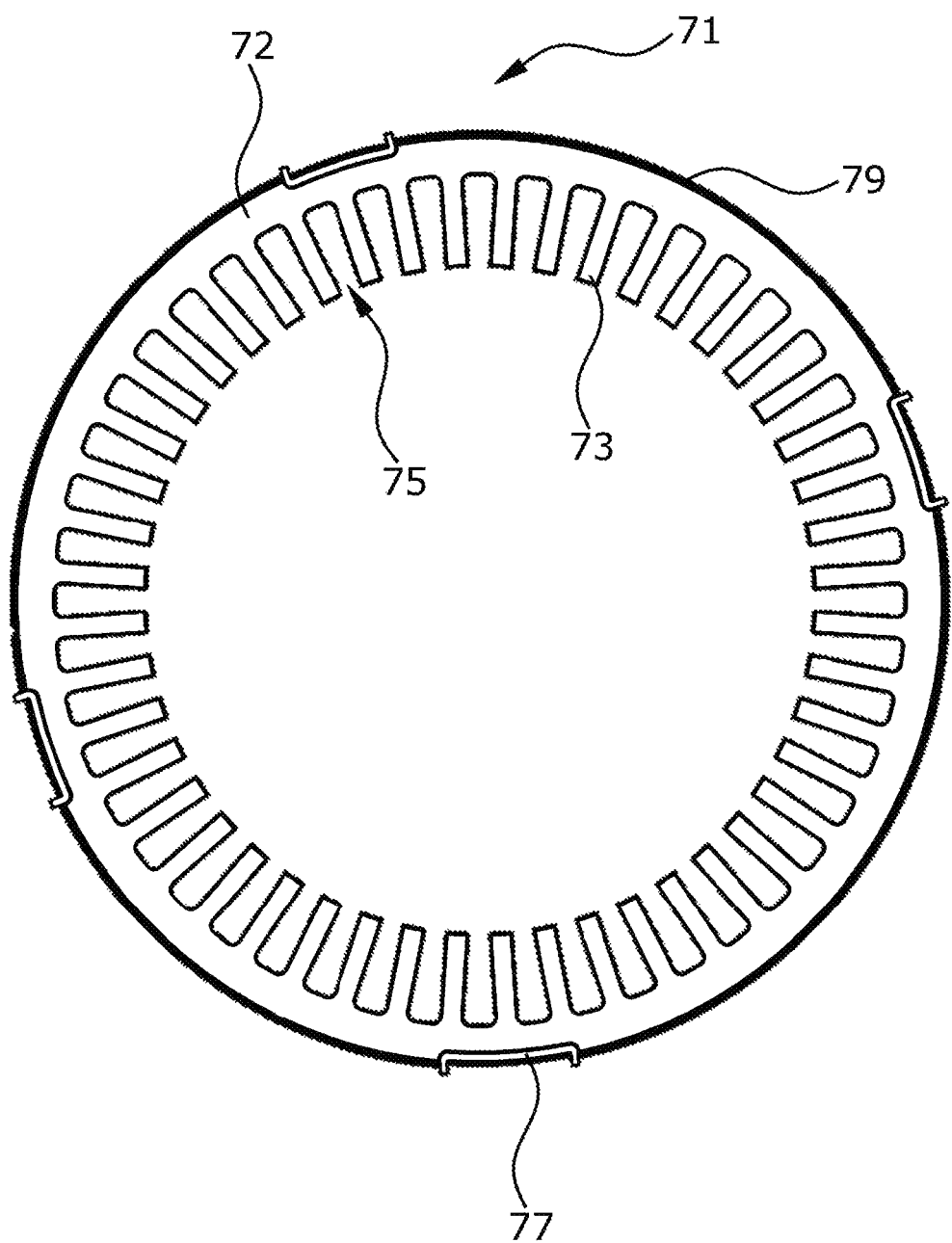
FIG. 9 shows a stator end plate.

FIG. 9 shows an example of an already described stator end plate 71 of the laminated core of the stator 72. This end plate represents the last plate of the laminated core in the stator. The stator end plate 71 has, just as all other plates of the laminated core do, teeth 73 and slots 75, the difference from the other plates of the laminated core being in a cutout or recess 77 on the outer edge 79 of the stator end plate 71. This recess 77 can accommodate, for example, the catch 27 of support element 7 of contact ring 1, so catch 27 can engage in this recess 77. Multiple support elements 7 on the outer edge of contact ring 1 allow contact ring 1 to be fixed to the stator 72.

In the same way, the support elements 7 can guide the contact ring 1 in the direction of the stator 72, so that the end sleeves can be inserted into the feedthroughs provided for this purpose automatically. After that, it is simpler to weld the sleeves on the top, that is the third plane, also called the phase plane, of the contact ring 1.

Figure 10:
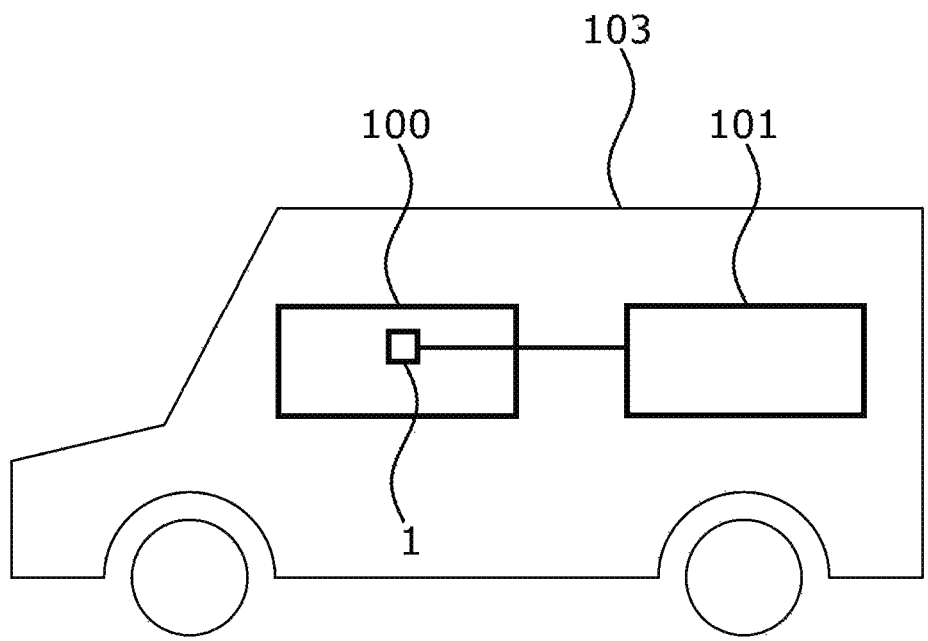
FIG. 10 shows a vehicle with an electric motor and a contact ring

FIG. 10 is a schematic diagram of a sample embodiment of a vehicle 103, for example a hybrid vehicle or an electric vehicle, comprising an electrical machine 100 with a sample embodiment of the contact ring 1 to power the vehicle 103.

FIG. 10 also shows the connection of the interface of the contact ring 1 to inverter 101.

The invention claimed is:

1. A contact ring for a stator of an electric motor, the contact ring comprising:
   a first plane with at least one first conductor;
   a second plane made of an electrically insulating material;
   a third plane with at least one second conductor;
   at least one first and one second feedthrough passing through the second plane;
   wherein the first feedthrough is smaller than the second feedthrough, and the first feedthrough guides coil wires of one coil and the second feedthrough guides coil wires of at least two coils, and
   wherein a cross section of the second conductor tapers from one current connection point to another current connection point, or has a jump in a cross section.

2. A contact ring according to claim 1, wherein the at least one second conductor stands upright on the contact ring.

3. A contact ring according to claim 1, wherein the coil wires are guided in the feedthroughs in crimped sleeves.

4. A contact ring according to claim 1, wherein the coil wires or sleeves are welded to the first or second conductor.

5. A contact ring according to claim 1, wherein the at least one first conductor has an extension in a direction of the second conductors, and this extension is routed through the first feedthrough.

6. A contact ring according claim 1, wherein the second plane has at least one support for the second conductors.

7. A contact ring according to claim 1, wherein the contact ring has at least one support element that interacts with the stator or a stator end plate of the stator.

8. A contact ring according claim 1, wherein the first plane has a smaller distance to the stator than the third plane, and the second plane is arranged between the first and third planes.

9. A vehicle with a contact ring for a stator of an electric motor according to claim 1.

\* \* \* \* \*